United States Patent
Collart et al.

(10) Patent No.: US 9,956,728 B2
(45) Date of Patent: May 1, 2018

(54) TOOLING FOR CREATING A COMPONENT MADE OF COMPOSITE, METHOD FOR CREATING A COMPONENT MADE OF COMPOSITE USING THE TOOLING, AND COMPOSITE COMPONENT THUS OBTAINED

(71) Applicant: Airbus Operations (S.A.S.), Toulouse (FR)

(72) Inventors: Cyrille Collart, Nantes (FR); Grégory Hache, Molieres (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 308 days.

(21) Appl. No.: 14/750,785

(22) Filed: Jun. 25, 2015

(65) Prior Publication Data

US 2016/0046085 A1 Feb. 18, 2016

(30) Foreign Application Priority Data

Jul. 8, 2014 (FR) ..................................... 14 56559

(51) Int. Cl.
*B29C 70/54* (2006.01)
*B29C 70/44* (2006.01)
(Continued)

(52) U.S. Cl.
CPC .......... *B29C 70/545* (2013.01); *B29C 70/345* (2013.01); *B29C 70/44* (2013.01);
(Continued)

(58) Field of Classification Search
CPC .... B29C 70/545; B29C 70/345; B29C 33/308
(Continued)

(56) References Cited

U.S. PATENT DOCUMENTS

| 2011/1031643 | | 2/2011 | Hache et al. | |
| 2011/0318540 | A1 | 12/2011 | Favreau et al. | |
| 2013/0069281 | A1* | 3/2013 | Hurlin | B29C 33/308 |
| | | | | 264/328.1 |

FOREIGN PATENT DOCUMENTS

| FR | 2 926 745 | 7/2009 |
| FR | 2 961 739 | 12/2011 |

(Continued)

OTHER PUBLICATIONS

Preliminary Search Report for French Application No. 1456559 dated Mar. 11, 2015.

*Primary Examiner* — Alison L Hindenlang
*Assistant Examiner* — Mohamed K Ahmed Ali
(74) *Attorney, Agent, or Firm* — Jenkins, Wilson, Taylor & Hunt, P.A.

(57) ABSTRACT

Tooling for creating a component made of composite, including at least one rigid element able to move between a rest position in which it is not in contact with the preform and an active position in which it is in contact with the preform, at least one elastic return configured to push the rigid element into the active position and hold it therein, and at least one hot-melt element configured to hold the rigid element in the rest position against the action of the elastic return as long as the temperature of the resin is below a threshold temperature above which the resin is softened. The disclosure also relates to a method for creating a component made of composite implementing the tooling and to a component made of composite thus obtained.

11 Claims, 2 Drawing Sheets

(51) Int. Cl.
  *B29C 70/34* (2006.01)
  *B29C 33/52* (2006.01)
  *B29K 101/12* (2006.01)
  *B29K 105/08* (2006.01)
(52) U.S. Cl.
  CPC .......... *B29C 33/52* (2013.01); *B29K 2101/12* (2013.01); *B29K 2105/0872* (2013.01)
(58) Field of Classification Search
  USPC .......................................... 264/155; 425/290
  See application file for complete search history.

(56) References Cited

FOREIGN PATENT DOCUMENTS

| FR | 2 985 682 A1 | 7/2013 |
| WO | WO 2013/156740 | 10/2013 |

* cited by examiner

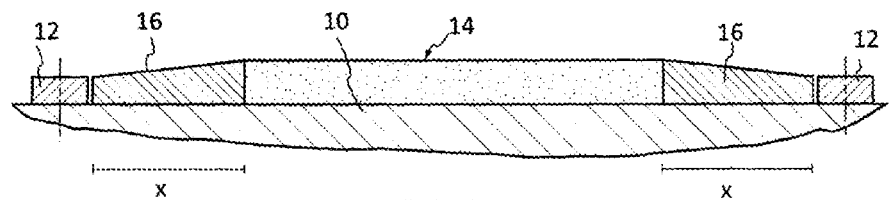
FIG. 1
PRIOR ART
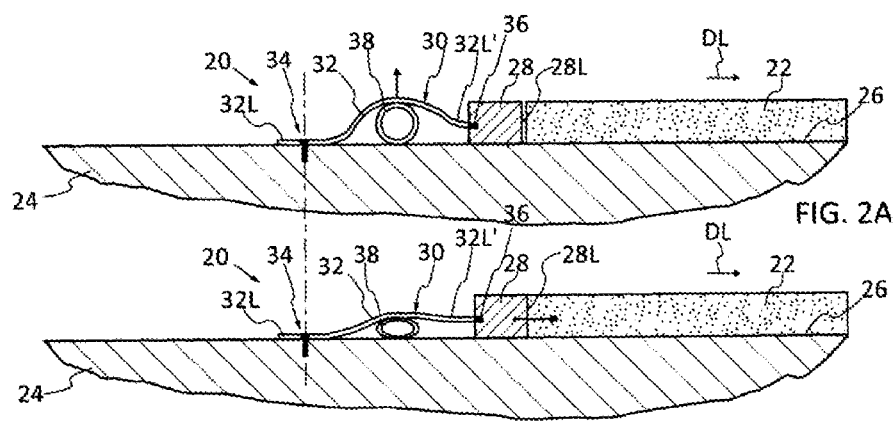
FIG. 2A
FIG. 2B
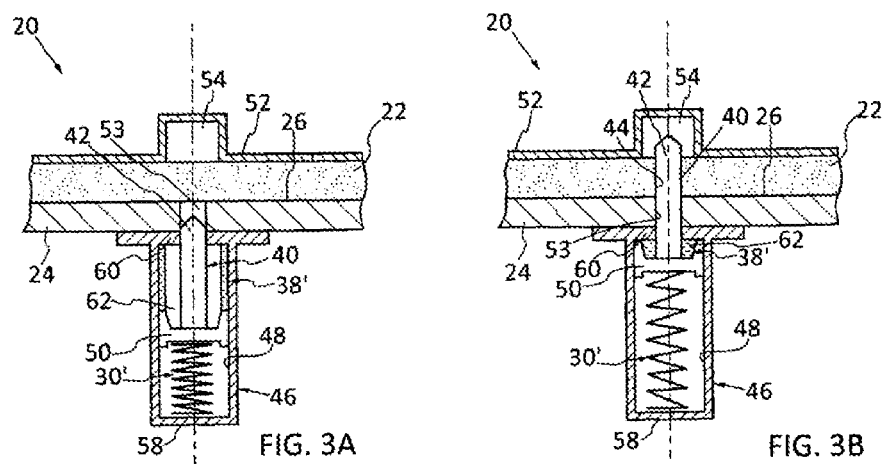
FIG. 3A
FIG. 3B

TOOLING FOR CREATING A COMPONENT MADE OF COMPOSITE, METHOD FOR CREATING A COMPONENT MADE OF COMPOSITE USING THE TOOLING, AND COMPOSITE COMPONENT THUS OBTAINED

CROSS-REFERENCE TO RELATED APPLICATION

This application claims the benefit of and priority to French patent application No. 14 56559 filed on Jul. 8, 2014, the entire disclosure of which is incorporated by reference herein.

BACKGROUND

The present disclosure relates to tooling for creating a component made of composite and to a method for creating a component made of composite using the tooling.

According to a first known embodiment, a component made of composite is produced from plies of fibers preimpregnated with resin. In a first step referred to as layup the plies of fibers are placed in a mold 10 which shapes the surface of the component on contact therewith and comprises fixed border blocks 12, around the periphery of the fiber plies, which shape the edge faces of the component as illustrated in FIG. 1.

During a second step, the fiber plies are subjected to a temperature and pressure cycle in order to obtain a consolidated component. During this second step, when the temperature exceeds a certain threshold, the resin softens and, under the action of the pressure of the covering, the resin flows toward the periphery of the component. As a result, following cooling, the component obtained has a height which tends to decrease from the middle of the component toward the edge faces of the component. This phenomenon, referred to as the free-edge effect, means that after polymerization or consolidation a component 14 is obtained as depicted in FIG. 1.

This component 14, the final cross section of which is substantially rectangular, comprises a rectangular central part and peripheral zones 16 of trapezoidal cross section with a width X liable to vary as a function of the thickness of the component and of the materials.

In a later step, the component 14 is edge-trimmed to remove the peripheral zones 16 of trapezoidal cross section.

As a result, according to this first embodiment, it is necessary to take the free-edge effect into consideration and increase the dimensions of the rough-form so that the width X is less than the width of the zones to be removed at the edges.

This first embodiment is unsatisfactory because it involves increasing the quantity of material used and more particularly the quantity of material machined, and this tends to increase the raw-material costs and the production costs.

Finally, this procedure runs against the current trend followed by manufacturing methods which seek to obtain a rough form the dimensions of which are as close as possible to those of the finished component.

Document FR-2,961,739 proposes a solution that aims to limit the free-edge effects. In that document, prior to the polymerization or consolidation phase, at least one additional ply is laid at the surface of the edge of the component in order to compensate for the migration of the resin.

Although that solution makes it possible to limit the free-edge effects, it leads to an increase in the mass of the component made of composite.

According to another aspect, component made of composites generally comprise through-holes to allow for example fasteners to pass through.

According to a first procedure, these holes are produced after polymerization or consolidation by piercing using a cutting tool.

The use of a cutting tool for piercing has the disadvantage that it cuts the fibers and increases the risks of delamination. As a result, in order to anticipate the diminishing of mechanical properties of the component associated with the piercing using a cutting tool, additional fiber plies or a glass fabric placed on the surface are provided in the region of the holes. This solution is unsatisfactory because it leads to an increase in the mass of the component made of composite.

According to a second procedure, the holes are produced by positioning an insert for each one of them in the mold prior to polymerization. This procedure is relatively complex to implement and this tends to increase production costs. In addition, it does not guarantee accurate positioning of the holes.

Document FR-2,926,745 proposes a third procedure for making holes in a component made of composite after polymerization or consolidation while at the same time limiting the impact this has on the mechanical properties of the component. This third procedure involves locally heating the component at the point where a hole is to be made, using a needle to separate the fibers and push back the resin matrix in the plastic state until the desired hole cross section is achieved, then cooling the component keeping the matrix pushed back and the fibers separated at the desired cross section.

This procedure is limited to thermoplastic matrices and cannot be used for thermoset matrices. In addition, it is necessary to provide an additional step after the consolidation or polymerization phase.

SUMMARY

The present disclosure seeks to remedy the disadvantages of the prior art by eliminating certain steps subsequent to the consolidation or polymerization phase, such as the edge-trimming and piercing steps.

To this end, one subject of the disclosure is tooling for creating a component made of composite, the tooling comprising a mold configured to receive a preform of fibers embedded in a resin, the resin having a threshold temperature above which the resin is softened and a compacting membrane configured to cover the preform arranged in the mold, the tooling comprising:

at least one rigid element occupying a rest position in which it is not in contact with the preform and is intended in use to occupy an active position in which it is in contact with the preform;

at least one elastic return associated with the rigid element and configured to push the rigid element into the active position and hold it therein; and at least one hot-melt element associated with the elastic return and configured to hold the rigid element in the rest position against the action of the elastic return as long as the temperature of the resin is below the threshold temperature.

This tooling makes it possible, during the consolidation or polymerization phase, to apply a pressure which, if applied to the edge face of the component, makes it possible to limit the appearance of free-edge effects and/or, if applied at right angles to the fibers, allows a rigid element with a pointed end to penetrate the preform so as to make a hole. In addition, this configuration allows the rigid element to be set in motion in a simple design synchronized with respect to the state of the resin.

According to a first alternative form, the rigid element is a border block which comprises a lateral surface substantially perpendicular to a surface of the mold on which surface the preform is arranged, the lateral surface being intended in use to be in contact with part of an edge face of the preform.

This alternative form makes it possible to avoid free-edge effects.

According to one embodiment, the elastic return is an elastic plate which comprises a first lateral edge that is immobile with respect to the mold and a second lateral edge in contact with the border block. The hot-melt element is a tube interposed between the mold and the elastic plate and is made from a material the melting point of which is substantially the same as the threshold temperature.

According to another alternative form, the rigid element is a perforating element comprising a pointed end designed to make a hole in the preform and oriented toward the preform in a direction aligned with the axis of the hole that is to be made, the mold comprising a through-orifice with an axis aligned with the axis of the hole that is to be made, and the tooling comprising a backing plate with a hole or housing that allows the passage of the perforating element with an axis aligned with the axis of the hole that is to be made.

For preference, each perforating element is mounted such as to be able to slide in a guide aligned with the axis of the hole that is to be made. According to one embodiment, the guide is a hollow cylinder in which there slides a piston supporting the perforating element, and the elastic return is a helical compression spring arranged between the piston and a first end wall provided at one end of the hollow cylinder. The holt-melt element is a tube which is positioned around the perforating element in the rest position and interposed between the piston and the mold and which is made from a material the melting point of which is substantially the same as the threshold temperature.

According to one configuration, the tooling comprises:
at least one perforating element comprising a pointed end designed to make a hole in the preform and oriented toward the preform in a direction aligned with the axis of the hole, the perforating element being mounted such as to be able to slide in a guide aligned with the axis of the hole that is to be made, the guide comprising a hollow cylinder in which there slides a piston supporting the perforating element;
at least one through-orifice made in the mold and at least one hole or housing made in a backing plate of the tooling, an axis of the through-orifice and an axis of the opening or housing being aligned with the axis of the hole that is to be made;
at least one helical compression spring arranged between the piston and a first end wall provided at one end of the hollow cylinder; and
at least one hot-melt element positioned around the perforating element in the rest position and interposed between the piston and the mold and which is made from a material the melting point of which is substantially the same as the threshold temperature.

Another subject of the disclosure is a method for creating a component made of composite using tooling according to the disclosure.

According to a first alternative form, the method comprises a step of applying a pressure force to at least one edge face of the preform when the temperature of the resin exceeds the threshold temperature.

According to another alternative form, the method comprises a step aimed at causing and causing a perforating element to penetrate the preform when the temperature of the resin exceeds the threshold temperature, so as to obtain a hole.

According to another alternative form, the method comprises:
applying a pressure force to at least one edge face of the preform when the temperature of the resin exceeds the threshold temperature; and
making a perforating element penetrate the preform when the temperature of the resin exceeds the threshold temperature, so as to obtain a hole.

Another subject of the disclosure is a component obtained using the method.

BRIEF DESCRIPTION OF THE DRAWINGS

Further features and advantages will become apparent from the following description of the disclosure which description is given purely by way of example and from studying the attached drawings in which:

FIG. 1 is a cross section schematically illustrating part of tooling used for consolidating or polymerizing a component made of composite which illustrates the prior art;

FIG. 2A is a schematic cross section through a block of tooling used for creating a component made of composite prior to a consolidation or polymerization phase and illustrating the disclosure;

FIG. 2B is a cross section through the block of the tooling visible in FIG. 2A during the consolidation or polymerization phase;

FIG. 3A is a schematic cross section through a piercing tool incorporated into tooling used for creating a component made of composite prior to a consolidation or polymerization phase and illustrating the disclosure;

FIG. 3B is a schematic cross section through the piercing tool incorporated into the tooling visible in FIG. 3A during the consolidation or polymerization phase;

DETAILED DESCRIPTION

Figure 4:
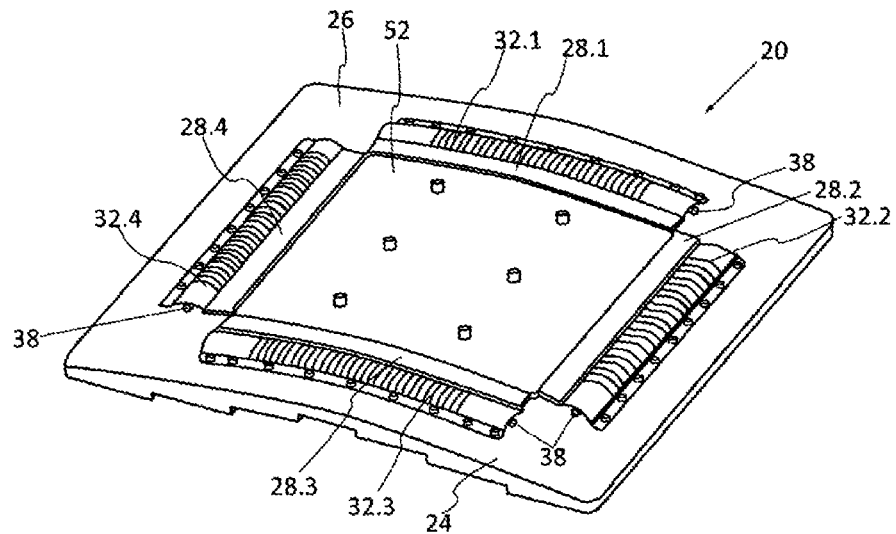
FIG. 4 is a perspective view from above of tooling illustrating one embodiment of the disclosure.

A component made of composite comprises fibers embedded in a thermoplastic resin matrix. These may be short or long fibers embedded in the resin matrix using various methods such as preimpregnation, infusion or even injection. Construction of a component made of composite comprises a first step comprising laying preimpregnated fibers on tooling 20 and a second step involving subjecting these fibers to a temperature and pressure cycle in order to obtain the component made of composite.

The second step is referred to as consolidation or polymerization. During this second step, when the temperature of the resin exceeds a threshold temperature Ts (which is dependent on the resin), the resin changes state, softens and becomes pasty or liquid.

According to one procedure, the fibers are arranged in the form of plies stacked on the tooling 20 by laying up for example. The disclosure is not restricted to this procedure for laying the fibers and covers all procedures.

For the remainder of the description, the collection of preimpregnated fibers laid in position on the tooling prior to the second phase is referred to as a preform 22.

The tooling 20 comprises a mold 24 configured to accept the fiber preform 22 and a compacting membrane configured to cover the preform 22.

Thus, the preform 22 comprises a lower surface which is in contact with an upper surface 26 of the mold the geometry of which is configured according to the desired geometry of the component made of composite.

The tooling 20 comprises at least one border block 28 which rests on the upper surface 26 of the mold 24. The preform 22 comprises a peripheral edge face at least part of which is in contact with a lateral surface 28L of the border block 28 the geometry of which is configured according to the geometry of the component made of composite to be produced. Each border block 28 is a rigid element.

According to one configuration, the upper surface 26 is substantially flat and the lateral surface 28L is flat and is perpendicular to the upper surface 26. However, the disclosure is not restricted to this configuration. Thus, the upper 26 and/or lateral 28L surfaces may be curved or comprise several planes.

For the remainder of the description, the plane of the fibers corresponds to a plane parallel to the upper surface 26, the fibers being arranged in the preform parallel to the upper surface 26. At a given point on the edge face of the preform, a longitudinal direction DL corresponds to a direction parallel to the plane of the fibers and perpendicular to the edge face of the preform 22 at this given point.

According to one feature of the disclosure, the border block 28 can move relative to the mold 24 between a rest position (visible in FIG. 2A) in which it applies no pressure to the preform 22 and an active position (visible in FIG. 2B) in which is applies pressure to the preform 22. For preference, the border block 28 effects a translational movement in the longitudinal direction DL (parallel to the plane of the fibers) toward the preform 22.

Advantageously, in the active position, the border block 28 applies to the preform a pressure force compatible with the geometry and characteristics of the component that is to be produced, when the temperature of the resin exceeds the threshold temperature Ts and until such time as the component becomes rigid.

This pressure force applied by the border block 28 to the preform 22 in the region of at least one edge face makes it possible to limit the free-edge effects by pushing back the resin when the latter is in the plastic state. In the absence of free-edge effects, there is no need to provide around the periphery of the component a zone that will be removed. The disclosure therefore makes it possible to eliminate a subsequent step of edge trimming.

According to another feature of the disclosure, the tooling 20 comprises at least one elastic return 30 configured to move the border block 28 toward the active position and hold it in this position. The presence of at least one elastic return 30 means that the change in position of the border block 28 becomes automatic and there is no need to provide an actuator such as an actuating cylinder or the like.

For preference, each border block 28 is associated with an elastic return 30. According to one first alternative form, each elastic return 30 is a spring leaf.

As an alternative, as illustrated in FIGS. 2A and 2B, each elastic return 30 is an elastic plate 32 of which a first lateral edge 32L is connected by a connection 34 to the mold 24 and of which the second lateral edge 32L', parallel to the first lateral edge 32L, is in contact with the border block 28, the elastic plate 32 being preloaded in such a way as to push the border block 28 into the active position.

According to one embodiment, the connection 34 comprises a series of screws which are aligned in a straight line parallel to the edge face of the component (i.e. parallel to the border block).

According to one embodiment, the border block 28 comprises a groove 36 parallel to the plane of the fibers and accepting the second lateral edge 32L'.

According to another feature, the tooling comprises, for each elastic return 30, a hot-melt element 38 which allows the border block 28 to be held in the rest position against the action of the elastic return 30 for as long as the temperature of the resin does not exceed the threshold temperature Ts. This configuration means that the action of the border block 28 can be synchronized with the plastic state of the resin of the matrix of the component that is to be produced.

For preference, the hot-melt element 38 is made of a material of which the state-change temperature Tc that marks the transition of the hot-melt element 38 from a solid state to a plastic state is substantially equal to the threshold temperature Ts of the resin of the matrix of the component that is to be produced.

According to one embodiment, the hot-melt element 38 is made from the resin used for the matrix of the component that is to be produced.

Advantageously, the hot-melt element 38 is interposed between the elastic plate 32 and the mold 24 and keeps the elastic plate 32 away from the mold 24 in the solid state. To do so, in the solid state, the hot-melt element 38 has a dimension greater than the distance separating the elastic plate 32 and the mold when the elastic plate 32 is not preloaded.

According to one embodiment, the hot-melt element 38 is a hollow tube with an axis parallel to the plane of the fibers. This shape is particularly suitable because the shape of the hot-melt element 38 in contact with the elastic plate 32 is curved, just like the bowed shape of the elastic plate 32.

As illustrated in FIG. 2A, when the hot-melt element 38 is in the solid state it applies a force to the elastic plate 32 which tends to move it away from the mold 24. In that case, the border block 28 is in the rest position and applies no pressure to the preform 22.

As illustrated in FIG. 2B, when the temperature exceeds the state-change temperature Tc, the hot-melt element 38 deforms and flattens. It no longer holds the elastic plate 32 away from the mold 24. Insofar as its first lateral edge 32L is fixed with respect to the mold 24, the elastic plate 32 applies a force to the border block 28 which moves into the active position and applies pressure to the edge face of the preform 22.

As described previously, the elastic return 30 and the border block 28 are two separate components and the elastic return 30 is connected by a connection 34 to the mold 24. As an alternative, the elastic return 30 and the border block 28 are one and the same component. The elastic return 30 is not connected directly to the mold 24 and comes into contact with a stop connected to the mold 24 or forming part of the mold 24.

According to one configuration illustrated in FIG. 4, the component that is to be produced comprises four straight sides. In that case, the tooling 20 comprises four border blocks 28.1 to 28.4 each having an elastic plate 32.1 to 32.4.

For preference, each border block has a length approximately equal to that of the corresponding side of the component. Each elastic plate has a length approximately equal to the border block with which it is associated. Finally, the hot-melt element in the form of a hollow tube has a length approximately equal to that of the elastic plate.

Of course, the disclosure is not restricted to this configuration. Thus, the tooling 20 comprises a number of mobile border blocks 28 that is equal to the number of substantially straight sides of the component that is to be produced.

According to another feature, the tooling comprises a perforating element 40 which is able to move with respect to the mold 24 between a rest position (visible in FIG. 3A) in which it applies no pressure to the preform 22 and an active position (visible in FIG. 3B) in which it applies pressure to the preform 22. For preference, the perforating element 40 effects a translational movement in a direction perpendicular to the plane of the fibers toward the preform 22.

Advantageously, the perforating element 40 applies a pressure force to the preform when the temperature of the resin exceeds the threshold temperature Ts and until such time as the component becomes rigid.

The perforating element has a pointed end 42 which, combined with the pressure force, allows it to penetrate the preform 22 and has a profile identical to that of the hole that is to be made. As it passes from the rest position into the active position, the perforating element 40 penetrates the preform 22, separating the fibers and pushing back the resin matrix. In the active position, the perforating element 40 keeps the fibers apart and the resin matrix pushed back. By maintaining the active position until the component becomes rigid, the perforating element 40 allows a hole 44 to be made in the component made of composite during the consolidation or polymerization phase and makes it possible to eliminate a subsequent machining step.

Making the hole during the second phase of consolidation or of polymerization means that this technique can be employed for components that have a thermoplastic matrix.

Advantageously, the perforating element 40 is mounted with the ability to slide in a guide 46 secured to the mold 24, the guide 46 being positioned with respect to the mold 24 according to the position of the axis of the hole 44 to be made and the orientation thereof.

According to one embodiment, the guide 46 is a hollow cylinder 48 having an axis coincident with that of the hole that is to be made and in which there slides a piston 50 supporting the perforating element 40 which is coaxial with the hollow cylinder 48.

This configuration allows the perforating element 40 to be positioned accurately with respect to the mold 24 and therefore allows the hole 44 to be positioned accurately with respect to the rest of the component made of composite produced.

According to one embodiment, the perforating element 40 is a needle. This needle may be similar to the one described in document FR 2,926,745.

Thus, this needle may be connected to the piston 50 detachably, the piston having the same functions as those of the body in document FR 2,926,745.

Advantageously, the tooling 20 comprises a backing plate 52 positioned against the opposite surface of the preform 22 to the one via which the perforating element 40 penetrates. The backing plate 52 restrains the preform 22 as the perforating element 40 penetrates the preform 22.

According to one configuration, the guide 46 is fixed to the mold 24 which comprises a through-orifice 53 to allow the passage of the perforating element 40 and the backing plate 52 is positioned against the upper surface of the preform 22.

In order to obtain a hole 44 passing through the component, the perforating element 40 has enough length to be able to pass through the preform 22. In that case, the backing plate 52 has a hole or a housing 54 allowing the end 42 of the perforating element 40 to pass.

The tool 20 also comprises a compacting membrane which covers the preform 22. In the known way, this compacting membrane generally comprises several layers, such as a gastight bag, at least one bleeder, a release film and a smoothing sheet (also known as a caul plate) which is preferably the backing plate 52. In FIGS. 3A, 3B, 4 and 5 only the backing plate 52 has been depicted. The other elements of the compacting membrane have not been depicted.

According to another feature of the disclosure, the tooling 20 comprises at least one elastic return 30' configured to move at least one perforating element 40 into the active position or hold it in this position.

For preference, each perforating element 40 is associated with an elastic return 30'. According to one embodiment illustrated in FIG. 5, each elastic return 30' is a helical compression spring 56 which is compressed so as to push the piston 50 toward the preform 22. For preference, the guide 46 at a first end comprises a first end wall 58 and at a second end comprises a second end wall 60 through which the perforating element 40 passes. The helical compression spring 56 is arranged between the first end wall 58 of the guide 46 and the piston 50.

According to another feature, the tooling comprises, for each elastic return 30', a hot-melt element 38' that allows the perforating element 40 to be held in the rest position against the action of the elastic return 30' as long as the temperature of the resin does not exceed the threshold temperature Ts.

For preference, the hot-melt element 38' has the same properties as the hot-melt element 38 associated with a border block 28.

Advantageously, the hot-melt element 38' is interposed between the piston 50 and the mold 24 and holds the perforating element 40 in the rest position in the solid state.

According to one embodiment, the hot-melt element 38' is a hollow tube which, in the solid state, has the perforating element 40 passing through it and is interposed between the second end wall 60 of the guide 46 and the piston 50.

Figure 5:
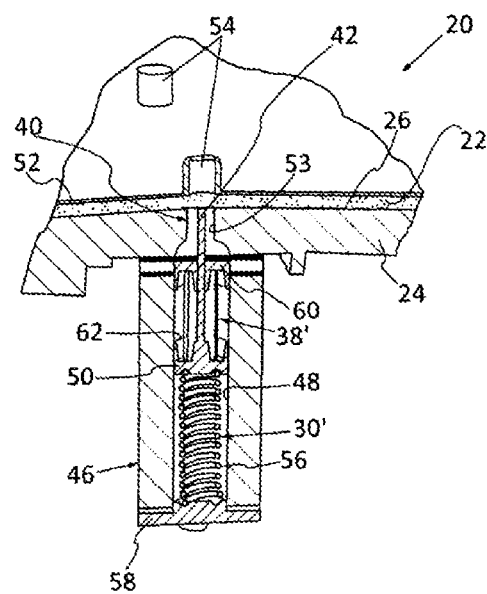
FIG. 5 is a cross section through part of tooling illustrating one embodiment of the disclosure.

As illustrated in FIGS. 3B and 5, the piston 50 comprises a housing 62 the shapes of which are adapted to house the hot-melt element 38' when the latter is in the plastic state or has resolidified.

As illustrated in FIG. 3A, when the hot-melt element 38' is in the solid state it holds the piston 50 away from the mold 24. In this case, the perforating element 40 is in the rest position and applies no pressure to the preform 22.

As illustrated in FIG. 3B, when the temperature exceeds the state-change temperature Tc, the hot-melt element 38' becomes deformed. It no longer holds the piston 50 which is then pushed by the helical compression spring 56 toward the mold 24. The perforating element 40 supported by the piston 50 applies a force to the preform 22, which force is oriented at right angles to the plane of the fibers and penetrates the preform 22 so as to make a hole 44.

Advantageously, the tooling comprises as many perforating elements 40 as there are holes to be made.

According to the embodiment described hereinabove, the perforating element 40 and the elastic return 30' are two distinct components. As an alternative, the perforating element 40 and the elastic return 30' are one and the same component.

For preference, the tooling comprises:
at least one rigid element occupying a rest position in which it is not in contact with the preform 22 and which is intended in use to occupy an active position in which it is in contact with the preform 22;
at least one elastic return 30, 30' associated with the rigid element and configured to push the rigid element into the active position and hold it therein; and
at least one hot-melt element 38, 38' configured to hold the rigid element in the rest position against the action of the elastic return 30, 30' as long as the temperature of the resin is below the threshold temperature Ts.

In use, when the hot-melt element 38, 38' is in the plastic state, the singular or plural elastic return 30, 30' positions/position the rigid element(s) 28, 40 in the active position.

In addition, each hot-melt element 38, 38' associated with an elastic return is configured to apply stress to the elastic return 30, 30' as long as the temperature of the resin is below the threshold temperature Ts.

According to a first alternative form, the rigid element is a border block 28 which comprises a lateral surface 28L substantially perpendicular to a surface 26 of the mold 24 on which the preform 22 is placed, the lateral surface 28L being intended in use to be in contact with part of the edge face of the preform 22.

According to another alternative form, the rigid element is a perforating element 40 comprising a pointed end 42 designed to make a hole 44 in the preform 22 and oriented toward the preform 22 in a direction aligned with the axis of the hole 44, the mold 24 comprises a through-orifice 53, the tooling 20 comprises a backing plate 22 with a hole or a housing 54 allowing the perforating element 40 to pass, and an axis of the through-orifice 53 and an axis of the opening or housing 54 are aligned with the axis of the hole 44 that is to be made.

According to another alternative form, the tooling comprises several mobile elements, some of them being border blocks and others being perforating elements.

Whatever the alternative form, the tooling 20 makes it possible, during one and the same step of manufacturing a component made of composite, namely during the consolidation or polymerization step, to perform the edge-trimming and/or piercing steps so as to obtain a consolidated preform the dimensions of which are very close or identical to the finished dimensions of the component that is to be produced. In this way, the tooling 20 allows the time taken to manufacture a component made of composite to be reduced.

While at least one exemplary embodiment of the present invention(s) has been shown and described, it should be understood that modifications, substitutions and alternatives may be apparent to one of ordinary skill in the art and can be made without departing from the scope of the disclosure described herein. This application is intended to cover any adaptations or variations of the specific embodiments discussed herein. In addition, in this disclosure, the terms "comprise" or "comprising" do not exclude other elements or steps, and the terms "a" or "one" do not exclude a plural number. Furthermore, characteristics or steps which have been described with reference to one of the above exemplary embodiments may also be used in combination with other characteristics or steps of other exemplary embodiments described above.

The invention claimed is:

1. Tooling for creating a component made of composite, the tooling comprising a mold configured to receive a preform of fibers embedded in a resin, the resin having a threshold temperature above which the resin is softened, and a compacting membrane configured to cover the preform arranged in the mold, the tooling comprising:
at least one rigid element configured to occupy a rest position in which it is not in contact with the preform, and, in use, to occupy an active position in which it is in contact with the preform;
at least one elastic return associated with the rigid element and configured to push the rigid element into the active position and hold it therein; and
at least one hot-melt element associated with the elastic return,
wherein the hot-melt element is configured to hold the rigid element in the rest position against the action of the elastic return as long as the temperature of the resin is below the threshold temperature and to allow the elastic return to push the rigid element to the active position when the resin exceeds the threshold temperature.

2. The tooling according to claim 1, wherein the rigid element is a border block which comprises a lateral surface substantially perpendicular to a surface of the mold on which surface the preform is arranged, the lateral surface being configured in use to be in contact with part of an edge face of the preform.

3. The tooling according to claim 2, wherein the elastic return is an elastic plate which comprises a first lateral edge that is immobile with respect to the mold and a second lateral edge in contact with the border block.

4. The tooling according to claim 3, wherein the hot-melt element is a tube interposed between the mold and the elastic plate and made from a material the melting point of which is substantially the same as the threshold temperature.

5. The tooling according to claim 1, wherein the rigid element is a perforating element comprising a pointed end designed to make a hole in the preform and oriented toward the preform in a direction aligned with the axis of the hole that is to be made, the mold comprising a through-orifice with an axis aligned with the axis of the hole that is to be made, and the tooling comprising a backing plate with a hole or housing that allows the passage of the perforating element with an axis aligned with the axis of the hole that is to be made.

6. The tooling according to claim 5, wherein the perforating element is mounted such as to be able to slide in a guide aligned with the axis of the hole that is to be made.

7. The tooling according to claim 6, wherein the guide is a hollow cylinder in which there slides a piston supporting the perforating element, and wherein the elastic return comprises a helical compression spring arranged between the piston and a first end wall provided at one end of the hollow cylinder.

8. The tooling according to claim 7, wherein the holt-melt element is a tube which is positioned around the perforating element in the rest position and interposed between the piston and the mold and which is made from a material the melting point of which is substantially the same as the threshold temperature.

9. The tooling according to claim 2, comprising:
at least one perforating element comprising a pointed end designed to make a hole in the preform and oriented toward the preform in a direction aligned with the axis of the hole, the perforating element being mounted such as to be able to slide in a guide aligned with the axis of the hole that is to be made, the guide comprising a hollow cylinder in which there slides a piston supporting the perforating element;

at least one through-orifice made in the mold and at least one hole or housing made in a backing plate of the tooling, an axis of the through-orifice and an axis of the hole or housing being aligned with the axis of the hole that is to be made;

at least one helical compression spring arranged between the piston and a first end wall provided at one end of the hollow cylinder; and at least one hot-melt element positioned around the perforating element in the rest position and interposed between the piston and the mold and which is made from a material the melting point of which is substantially the same as the threshold temperature.

10. A method for creating a component made of composite using a heat source and tooling, the method comprising:

providing the tooling comprising:

a mold configured to receive a preform of fibers embedded in a resin, the resin having a threshold temperature above which the resin is softened;

a compacting membrane configured to cover the preform arranged in the mold;

at least one rigid element configured to occupy a rest position in which it is not in contact with the preform, and, in use, to occupy an active position in which it is in contact with the preform;

at least one elastic return associated with the rigid element and configured to push the rigid element into the active position and hold it therein; and at least one hot-melt element associated with the elastic return, wherein the hot-melt element is configured to hold the rigid element in the rest position against the action of the elastic return as long as the temperature of the resin is below the threshold temperature and to allow the elastic return to push the rigid element to the active position when the resin exceeds the threshold temperature;

placing the preform on the tooling;

raising the temperature of the preform; and applying a pressure force to at least one edge face of the preform via the rigid element when the temperature of the resin exceeds the threshold temperature.

11. A method for creating a component made of composite with at least one hole using a heat source and tooling, the method comprising:

providing the tooling comprising:

a mold configured to receive a preform of fibers embedded in a resin, the resin having a threshold temperature above which the resin is softened;

a compacting membrane configured to cover the preform arranged in the mold;

at least one rigid element configured to occupy a rest position in which it is not in contact with the preform, and, in use, to occupy an active position in which it is in contact with the preform;

at least one elastic return associated with the rigid element and configured to push the rigid element into the active position and hold it therein; and at least one hot-melt element associated with the elastic return, wherein the hot-melt element is configured to hold the rigid element in the rest position against the action of the elastic return as long as the temperature of the resin is below the threshold temperature and to allow the elastic return to push the rigid element to the active position when the resin exceeds the threshold temperature;

placing the preform on the tooling;

raising the temperature of the preform; and causing a perforating element to penetrate the preform when the temperature of the resin exceeds the threshold temperature, so as to obtain a hole.

\* \* \* \* \*